US008628707B2

(12) United States Patent
Harris et al.

(10) Patent No.: US 8,628,707 B2
(45) Date of Patent: Jan. 14, 2014

(54) SYSTEM AND METHOD FOR MAKING CARBON FOAM ANODES

(75) Inventors: Randall J. Harris, Mount Gay, WV (US); Damian Wales, Powellton, WV (US)

(73) Assignee: Carbonxt Group Limited, Eartwood, New South Wales (AU)

(*) Notice: Subject to any disclaimer, the term of this patent is extended or adjusted under 35 U.S.C. 154(b) by 1113 days.

(21) Appl. No.: 12/008,268

(22) Filed: Jan. 8, 2008

(65) Prior Publication Data
US 2009/0176130 A1    Jul. 9, 2009

(51) Int. Cl.
*C01B 31/00* (2006.01)
*B29C 44/34* (2006.01)
*H01M 8/00* (2006.01)
*B32B 3/26* (2006.01)

(52) U.S. Cl.
USPC ............. 264/51; 264/29.1; 264/29.7; 264/41; 264/42; 264/45.1; 264/101; 264/104; 264/105; 264/299; 264/319; 429/400

(58) Field of Classification Search
USPC ........... 264/29.1, 29.3, 29.6, 29.7, 41, 42, 43, 264/44, 45.1, 51, 101, 104, 105, 299, 319; 429/400; 428/304.4
See application file for complete search history.

(56) References Cited

U.S. PATENT DOCUMENTS

| 1,565,129 A | 12/1925 | Wallace |
| 1,819,166 A | 8/1931 | Hass |
| 1,867,750 A | 7/1932 | Naugle |
| 3,961,020 A | 6/1976 | Seki |
| 4,014,817 A | 3/1977 | Johnson et al. |
| 4,083,940 A * | 4/1978 | Das ............................... 252/510 |
| 4,157,314 A | 6/1979 | Murty |
| 4,397,248 A | 8/1983 | Mehta et al. |
| 4,780,112 A * | 10/1988 | Lloyd et al. ..................... 44/621 |
| 4,810,258 A | 3/1989 | Greene |
| 5,017,281 A | 5/1991 | Sadeghi et al. |
| 5,179,058 A | 1/1993 | Knoblauch et al. |

(Continued)

FOREIGN PATENT DOCUMENTS

| DE | 3743248 C1 | 9/1989 |
| WO | WO 2005/035128 A2 | 4/2005 |
| WO | WO-2009089356 A1 | 7/2009 |

OTHER PUBLICATIONS

PCT Notification of Transmittal of the International Search Report and the Written Opinion of the International Searching Authority, or the Declaration (Aug. 1, 2009); (PCT/US2009/030448).

(Continued)

*Primary Examiner* — Atul P. Khare
(74) *Attorney, Agent, or Firm* — Patton Boggs LLP

(57) ABSTRACT

A system for making carbon foam anodes including a digestion vessel in communication with a coal feedstock unit for producing a digested coal; a mold having an interior for accepting the digested coal to produce an ungraphitized carbon foam anode having a desired shape; a pressure unit in communication with the mold for producing an increased pressure within the interior of said mold; a heating element in communication with the mold to provide heat to the mold sufficient to convert the digested coal into the ungraphitized carbon foam anode; and a graphitization oven for graphitizing the ungraphitized carbon foam anode to produce the carbon foam anode. The present invention further includes methods for making carbon foam anodes.

3 Claims, 8 Drawing Sheets

(56) References Cited

U.S. PATENT DOCUMENTS

| | | | |
|---|---|---|---|
| 5,281,406 | A | 1/1994 | Stalling et al. |
| 5,314,124 | A | 5/1994 | Kindig |
| 5,437,845 | A | 8/1995 | Brioni et al. |
| 5,888,469 | A | 3/1999 | Stiller et al. |
| 6,033,506 | A | 3/2000 | Klett |
| 6,077,464 | A * | 6/2000 | Murdie et al. ............... 264/29.5 |
| 6,160,193 | A | 12/2000 | Gore |
| 6,544,491 | B1 * | 4/2003 | Stiller et al. ................. 423/448 |
| 6,733,737 | B1 * | 5/2004 | Tan et al. .................... 423/447.5 |
| 6,797,251 | B1 | 9/2004 | Bennett et al. |
| 6,899,970 | B1 | 5/2005 | Rogers et al. |
| 6,979,513 | B2 | 12/2005 | Kelley et al. |
| 7,255,233 | B2 | 8/2007 | Daniels et al. |
| 7,648,691 | B2 | 1/2010 | Nagata |
| 2001/0002387 | A1 | 5/2001 | Tsutsumi et al. |
| 2003/0064216 | A1 | 4/2003 | Tobita et al. |
| 2003/0181315 | A1 | 9/2003 | Suzuki et al. |
| 2004/0065353 | A1 | 4/2004 | Tunnicliffe et al. |
| 2004/0140261 | A1 | 7/2004 | Taylor et al. |
| 2006/0150474 | A1 * | 7/2006 | Lloyd ............................ 44/622 |
| 2007/0277430 | A1 | 12/2007 | Jackman et al. |
| 2009/0172998 | A1 | 7/2009 | Harris et al. |

OTHER PUBLICATIONS

PCT Notification of Transmittal of the International Search Report and the Written Opinion of the International Searching Authority, or the Declaration (Aug. 1, 2009); (PCT/US09/30447).

PCT Notification of Transmittal of the International Search Report and the Written Opinion of the International Searching Authority, or the Declaration (Aug. 1, 2009); (PCT/US09/030442).

In the US Patent and Trademark Office U.S. Appl. No. 12/008,269 Final Office Action dated Jun. 19, 2012, 25 pages.

In the US Patent and Trademark Office U.S. Appl. No. 12/008,287 Non-Final Office Action dated Aug. 22, 2012, 9 pages.

In the US Patent and Trademark Office U.S. Appl. No. 12/008,269 Non-Final Office Action dated Oct. 11, 2011, 19 pages.

In the US Patent and Trademark Office U.S. Appl. No. 12/008,287 Final Office Action dated Feb. 3, 2011, 8 pages.

In the US Patent and Trademark Office U.S. Appl. No. 12/008,287 Non-Final Office Action dated Sep. 29, 2010, 7 pages.

In the US Patent and Trademark Office U.S. Appl. No. 12/246,007 Restriction Office Action dated Feb. 1, 2012, 4 pages.

In the US Patent and Trademark Office U.S. Appl. No. 12/967,874 Non-Final Office Action dated Apr. 11, 2012, 3 pages.

In the US Patent and Trademark Office U.S Appl. No. 12/967,874 Restriction Office Action dated Dec. 27, 2011, 5 pages.

PCT Notification of Transmittal of the International Search Report and the Written Opinion of the International Searching Authority, or the Declaration (Jan. 2, 2010); (PCT/US2009/058150).

In the US Patent and Trademark Office U.S. Appl. No. 12/246,007 Non-Final Office Action dated Oct. 23, 2012, 22 pages.

In the US Patent and Trademark Office U.S. Appl. No. 12/967,874 Final Office Action dated Oct. 17, 2012, 3 pages.

In the US Patent and Trademark Office U.S. Appl. No. 12/008,287 Final Office Action dated Feb. 14, 2013, 9 pages.

* cited by examiner

SYSTEM AND METHOD FOR MAKING CARBON FOAM ANODES

FIELD OF THE INVENTION

This invention relates to the field of fuel cells, and in particular to the field of high temperature fuel cells for the direct electrochemical conversion of coal to electrical energy. In addition, the invention is further directed to coal that has been digested to remove the contaminants and inorganics contained in the coal.

BACKGROUND OF THE INVENTION

A fuel cell is an electrochemical energy conversion device and it produces electricity from various external quantities of fuel (anode side) and oxidant (cathode side). Generally these react in the presence of an electrolyte wherein the reactants flow in and reaction products flow out while the electrolyte remains in the cell. Typically, fuel cells can operate virtually continuously as long as the necessary flows of reactants are maintained.

Many combinations of fuel and oxidants are possible. For example, a hydrogen cell uses hydrogen as fuel and oxygen as the oxidant. Other fuel cells include hydrocarbons and alcohols. Due to its abundance, coal has been proposed as a fuel cell reactant as well. This abundance coupled with ever-increasing populations around the world, there is a compelling and important need to find more efficient and responsible ways to use coal, such as with these fuel cells.

Attempts to use carbon in fuel cells has been tried. For example, one of the earlier attempts to directly consume coal in a fuel cell was made in 1966 when a carbon rod was used as the anode and platinum as the oxygen electrode in a fuel cell that employed molten potassium nitrate as the electrolyte. When oxygen was supplied to the platinum electrode, a current was observed in the external circuit. Nevertheless, these results were not encouraging because of the direct chemical oxidation of carbon by the potassium nitrate electrolyte.

Another attempt used molten sodium hydroxide electrolyte contained in an iron pot which served as the air cathode and a carbon rod as the consumable anode. The cell is operated at about 500° C. with current densities of over 100 milliamps per square centimeter. This attempt was plagued by the oxidation of the hydrogen and not the carbon, along with the sodium carbonate by the reaction of the carbon with molten sodium hydroxide, thus producing an undesirable side reaction involving the electrolyte, and rendering it unstable in that environment.

In the last several decades, high temperature fuel cells employing either molten carbonate or solid oxide ceramic electrolytes have been reported. In these fuel cells, coal-derived fuels were employed as consumable gas fuels. Presently, the high temperature solid oxide fuel cells under development use hydrogen derived either from natural gas or from coal. In addition to these attempts, there have also been attempts with molten salt electrolyte-based direct carbon fuel cells, molten anode-based direct carbon fuel cells and the like. With all of these attempts, the coal that is employed generally contains inorganics, minerals, and contaminants that produce ash and contaminants to be deposited in the bottom of the fuel cell that impedes the efficiency of the fuel cell. Further, when they deposit in the fuel cell, effort must be routinely expended to clean the fuel cell for its efficient operation.

Moreover, the energy density of carbon fuel cells is generally higher than that found with hydrogen and oxygen fuel cells. Due to the chemistry involved, the energy density for hydrogen and oxygen fuel cells produces approximately two electrons in a single reaction, whereas fuel cells using carbon anodes produce four electrons in a single reaction. Thus, the energy density is approximately twice that of a hydrogen fuel cell with a carbon fuel cell.

SUMMARY

In one embodiment, the system and method for making carbon foam anodes ("system for making carbon foam anodes") includes and is directed to a fuel cell for the direct conversion of coal into electricity. The present system for making carbon foam anode includes a pre-digested coal anode that has had impurities, minerals, and contaminants removed prior to being molded into an electrode. The system for making carbon foam anodes includes a carbon foam anode, a cathode, and an electrolyte. Various embodiments relating to the carbon foam anode and system are disclosed including solid carbon foam anodes and particles of carbon foam anodes used in a molten carbon fuel cell system.

In another embodiment, the present system for making carbon foam anodes includes a novel molding method for making such carbon foam anodes. In a particular embodiment, coal is digested in accordance with the present invention and then placed into a mold having a desirable shape or form. Pressure is increased within the mold and then it is subjected to a stepped or ramped temperature program to a desirable temperature as disclosed herein. Once at a maximum temperature, the pressure within the mold is decreased quickly to produce an ungraphitized carbon foam anode. After this, it is placed into a graphitization oven where it is turned into a graphitized carbon foam anode. Once the carbon foam electrode has been graphitized, it can then be inserted into a carbon fuel cell. The present invention produces carbon foam anodes of improved or having improved power density due to the tight packing of the carbon atoms.

In one embodiment, the present invention includes a system for making carbon foam anodes including a digestion vessel in communication with a coal feedstock unit for producing a digested coal; a mold having an interior for accepting the digested coal to produce an ungraphitized carbon foam anode having a desired shape; a pressure unit in communication with the mold for producing an increased and/or positive pressure within the interior of said mold; a heating element in communication with the mold to provide heat to the mold sufficient to convert the digested coal into the ungraphitized carbon foam anode; and a graphitization oven for graphitizing the ungraphitized carbon foam anode to produce the carbon foam anode. The present invention further includes methods for making carbon foam anodes and a carbon fuel cell.

DETAILED DESCRIPTION OF THE DRAWINGS

Figure 1:
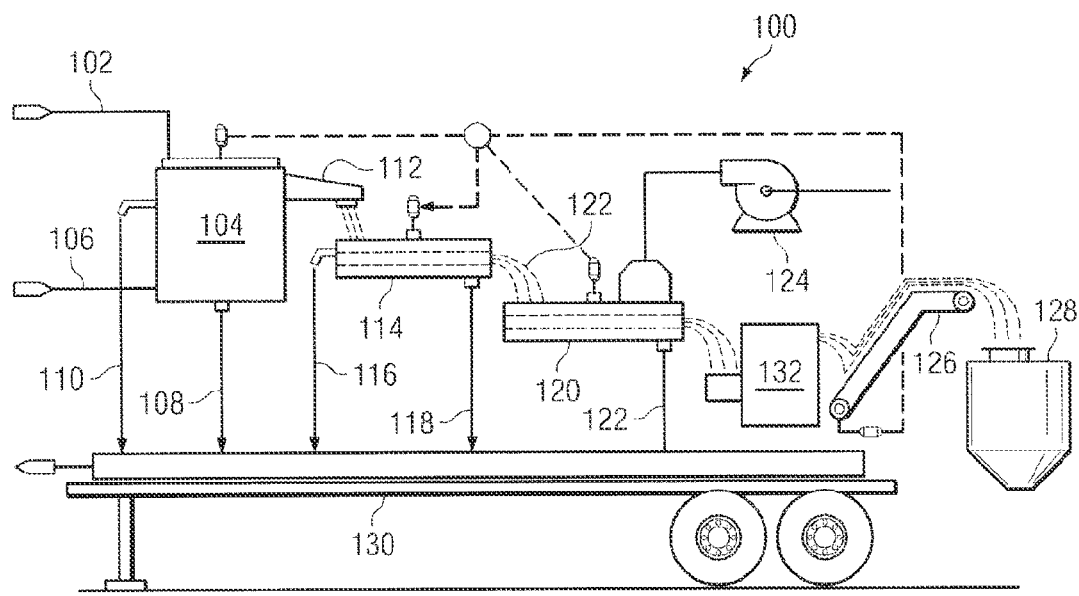
FIG. 1 illustrates a schematic diagram of a carbonaceous material feedstock unit according to an embodiment of the present invention.

In the drawings, like or similar elements are designated with identical reference numerals throughout the several views and figures thereof, and various depicted elements may not be drawn necessarily to scale.

The term "carbonaceous" means all materials that consist of substantial amounts of carbon. Without limitation the term includes coal, refined coal, activated carbon, carbon black carbon products, solid crude oil, coal tar pitch, carbon fibers, tar, carbon, coke, graphite, and other carbon structures.

The term "digested carbonaceous material" means a carbonaceous material that has been subject to a cleaning or digesting process as herein described. In one aspect, the term means chemically cleaning the carbonaceous material by digesting the minerals embedded within the carbonaceous material. This term may further mean a carbonaceous material that has been chemically cleaned and may be noted as "chemically cleaned carbonaceous material."

The term "macropore" typically means pores having a diameter size of greater than 50 nm. The term "micropore" typically means pores having a diameter size of smaller than 50 nm. The term "product" means all materials that are made from refined carbonaceous material, including without limitation: plastics, fibers, solvents, pharmaceuticals, carbon black, inks, activated carbon, carbon, tar, specialty minerals, boiler fuels, additives, gas cleanup, and the like.

FIG. 1 illustrates an embodiment 100 of a carbonaceous material feedstock unit according to the present invention. In one embodiment, the carbonaceous material feedstock production unit 100 may be portable for relocating it at any location that produces a waste stream and/or settling pond stream containing carbonaceous material, such as preparation plants or washeries as is known to those skilled in the arts. Typically, a preparation plant is a plant that washes, sorts, sizes, cleans, and the like a source of carbonaceous material usually in proximity to a carbonaceous material mining operation, for example. Typically, these preparation plants produce smaller-sized carbonaceous material that is not processed further due to the cost of removing them from their carrier fluid stream, such as water. These smaller-sized carbonaceous particles required may be produced from washing the clays, carbonaceous material, and rocks off of the larger sized coal, which are generally separated out and discarded using various density related processes at a preparation plant. They are generally discarded because the size of the waste carbonaceous material is too small or not worth the expense to recover it from the preparation plant's process stream, thus this waste carbonaceous material flows with the waste water out to settling ponds where the waste carbonaceous material settles to the bottom of the settling pond and the waste water is later treated. In some instances, the percentage of carbonaceous material in these settling pond streams and/or settling ponds may be between 25%-75% of the entire settling pond depending on the age of the settling pond. In one aspect, the system for refining carbonaceous material may recover the carbonaceous material from a preparation plant's process stream, such as a settling pond stream. In another aspect, the system for refining carbonaceous material may recover the carbonaceous material from an impoundment, such as a settling pond.

The carbonaceous material feedstock production unit 100 may be moved or located nearby a carbonaceous material washery, carbonaceous material processing plant, coal preparation plant, coal mining plant, settling impoundment, settling pond, and the like where it is connected via pipe 102 to a waste stream of a preparation plant or settling pond stream material with water added that contains the smaller-sized carbonaceous material. The pipe 102 is connected to a vibratory screen unit 104 that separates the larger-sized carbonaceous material pieces from the smaller-sized carbonaceous material. In one aspect, the vibratory screen unit 104 includes a series of descending screens of decreasing screen size. The vibratory screen units 104 may include gravity and/or density separation apparatuses, such as teeter beds, waffle tables, jigs, pulsing water beds, steady flow beds, and the like. Thus, the larger-sized carbonaceous material pieces are screened out at the upper screens while the smaller-sized carbonaceous material falls through to the lower parts of the vibratory screen unit 104. In one aspect, one of the intermediate screens may contain the desired size of carbonaceous material. Offsite process water is supplied through pipe 106 to the vibratory screen unit 104 for improved washing and processing at the vibratory screen unit 104.

In one embodiment, the smaller-sized particles and larger-sized particles that exceed a desirable predetermined size of carbonaceous material are removed from the vibratory screen unit 104 via pipes 108 and 110 and may be returned to the preparation plant, for example. Offsite process water may also accompany the undesirable particles exiting the vibratory screen unit 104. For ease of use, the pipes 102, 106, 108, and 110 may be flexible hoses, tubes, pipes, and the like for ease of connecting the carbonaceous material feedstock production unit 100 to the preparation plant. The desirable sized particles exit the vibratory screen unit 104 and flow via pipe 112 to a density differential separator 114. In one embodiment, the density differential separator 114 separates higher-density particles from lower-density particles. Typically, the lower-density particles will contain the desired carbonaceous material particles that will be processed as further described. The higher-density particles typically contain the material and particles that may not be used by the system for refining carbonaceous material.

The desirable-sized particles exit the density differential separator 114 and flow via pipe 122 to another vibratory screen unit 120. In one aspect, the vibratory screen unit 120 may additionally wash the particles and may further dry the carbonaceous material particles that enter the vibratory screen unit 120. Any sized particles that are not of a desired size may exit the vibratory screen unit 120 via pipe 122 and be returned to the preparation plant, for example. The washed and sized carbonaceous material may further be dried by forced air from a dryer 124. In one embodiment, the water content is preferably from about 8% to about 40% w/w, and more preferably from about 12% to about 18% w/w. As described more fully below, carbonaceous material having such a water content may be ideal for the later digestion processes and may eliminate the necessity and cost of re-wetting dried carbonaceous material. This may further save energy that would otherwise be expended to wet completely dry carbonaceous material that is typically supplied to refining plants. In one aspect, the water content may be further reduced at a preparation plant by use of a microwave drying unit and/or centrifuge to lower the expense of transporting the carbonaceous material to an off-site refining plant. In this aspect, the water content of the carbonaceous material may be approximately 7% w/w.

Once the carbonaceous material possesses water at a desired level, it may be transported by a conveyor or other appropriate device to an elevated height to be dropped into storage sacks, vessels, tanks, trucks, containers, and the like (storage containers 128). As described above, since the carbonaceous material feedstock production unit 100 may be movable or portable, the units described above may be mounted on a vehicle, such as a trailer 130. This enables the carbonaceous material feedstock production unit 100 to be moved from one site or preparation plant to another for supplying the later processes described herein with carbonaceous material of a desirable size and water or moisture content, while reducing the waste stream going to settling ponds, for example. In one embodiment, once the storage containers 128 are filled they may be loaded or moved to another vehicle (not shown) and may be transported to a microwave drying unit or digestion unit further described below. In one embodiment, the carbonaceous material feedstock production unit 100 may further include a centrifuge unit 132 for accepting a feed of carbonaceous material from the vibratory screen unit 120 for further reducing the moisture and/or water content of the carbonaceous material.

Figure 2:
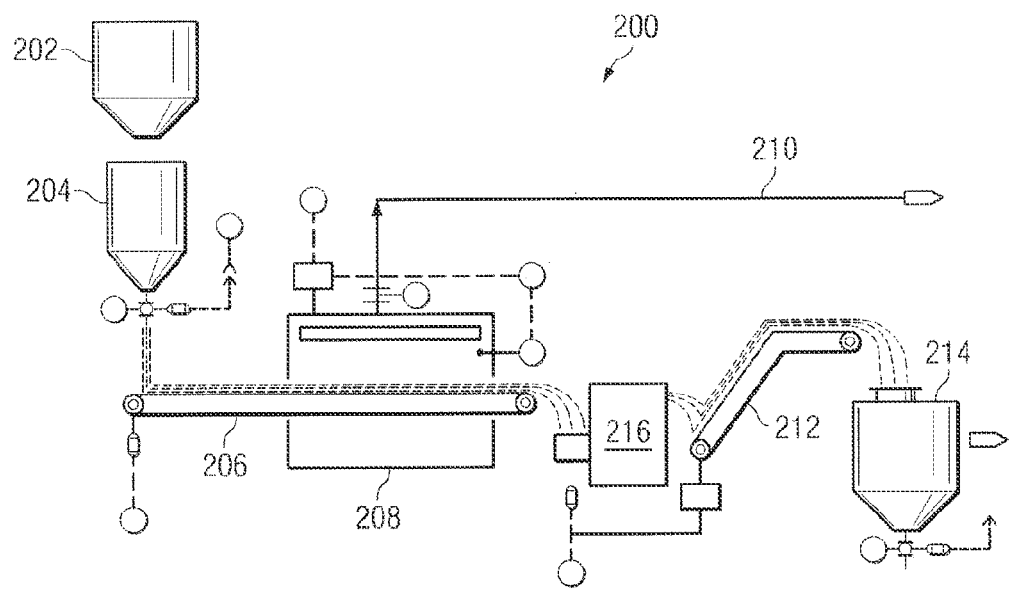
FIG. 2 illustrates a schematic diagram of a microwave drying unit according to an embodiment of the present invention.

FIG. 2 illustrates an embodiment 200 of a microwave drying unit according to the present invention. In one embodiment, the system for refining carbonaceous material includes a microwave drying unit 200 and in another embodiment the system for refining carbonaceous material does not include a microwave drying unit 200. In this embodiment, storage containers 202 and 128 are emptied into a hopper 204 that feeds a conveyor 206 that passes through the microwave unit 208 for providing additional lowering of the water content of the carbonaceous material should it be desired. After exiting the microwave unit 208, the carbonaceous material may be transported via conveyor 212 to a hopper 214 for feeding to the next process unit. Hoppers 204 and 214 may be vibratory hoppers for unsettling clumped together carbonaceous material. In one embodiment, the microwave drying unit 200 may further include a centrifuge unit 216 for accepting a feed of carbonaceous material from the microwave unit 208 for further reducing the moisture and/or water content of the carbonaceous material. In another embodiment, additional centrifuge units may be used with the microwave unit 208, such as just before the microwave unit 208, for example.

Figure 3:
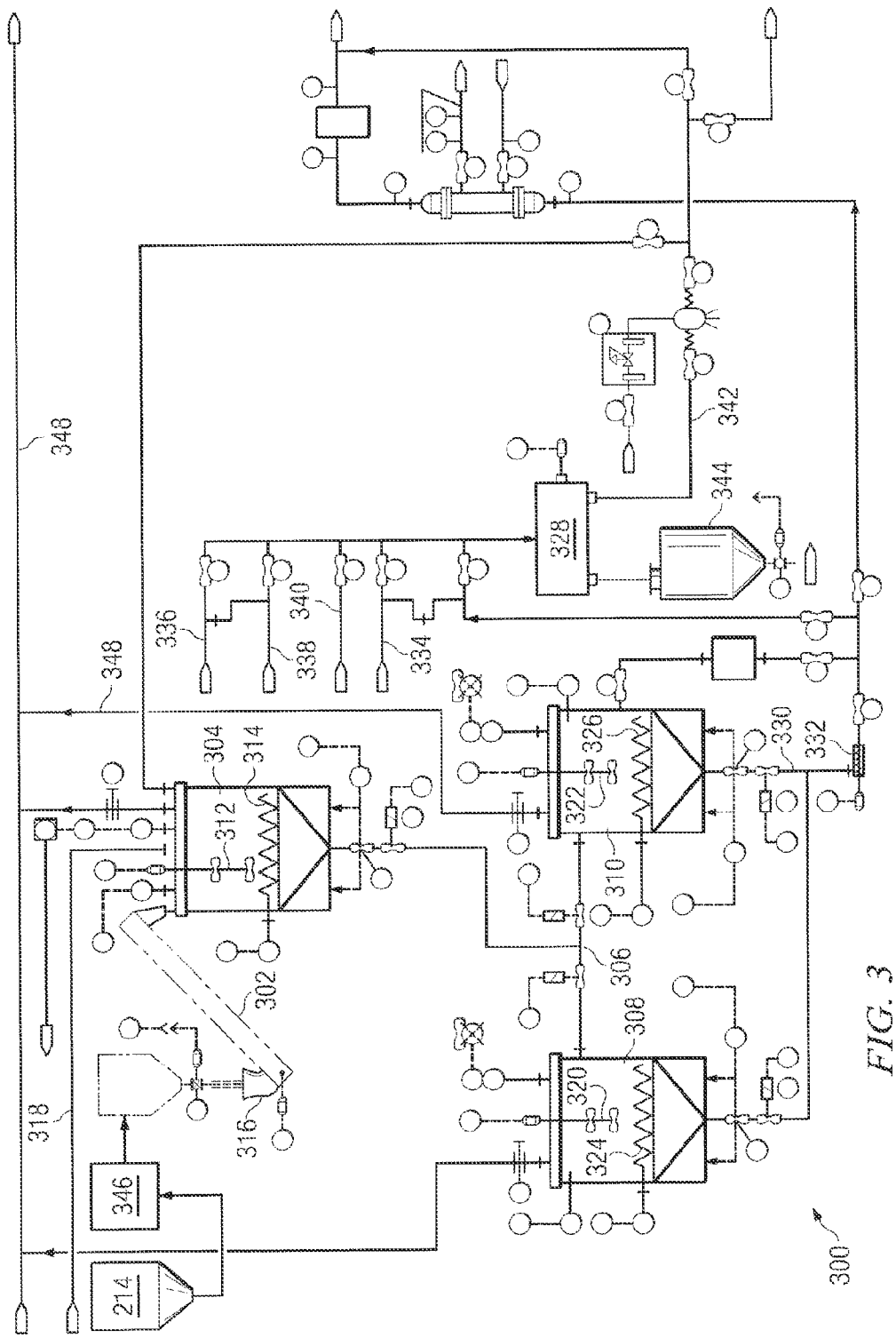
FIG. 3 illustrates a schematic diagram of a digestion unit according to an embodiment of the present invention.

FIG. 3 illustrates an embodiment 300 of a digestion unit according to the present invention. Digestion unit 300 may include a conveyor 302 for transporting the cleaned and sized carbonaceous material to moisture balancing unit 346. The moisture balancing unit 346 may include a source of water and steam that controllably increases the moisture content of the cleaned and sized carbonaceous material. In cases where the moisture content of the carbonaceous material is reduced for transportation purposes, then the moisture balancing unit 346 may add moisture to the carbonaceous material. In one example, the moisture balancing unit 346 may produce carbonaceous material with a preferable moisture content of from about 7% to about 40% w/w, and more preferably a moisture content of from about 25% to about 35% w/w. After the moisture content has been adjusted or balanced in the moisture balancing unit 346, it may be fed to a conveyor 302, which transports the carbonaceous material to one or more digestion vessels 304, 308, and 310.

In one aspect, at the base of the conveyor 302 is a load cell 316 for weighing the carbonaceous material that enters the conveyor 302. Digestion unit 300 includes an acid mixture solution that is transported from an $H_2SiF_6$ adjustment tank 712 (FIG. 7) via pipe 318. The acid mixture solution is fed into the digestion vessel 304, which includes a mixer 312 and a heater 314. The carbonaceous material is fed into the digestion vessel 304 and the digestion of the carbonaceous material is started A valve 306 may be used to switch the carbonaceous material/acid mixture solution between the digestion vessels 304, 308, and 310. In one aspect, the digestion vessels 304, 308, and 310 may be gravity fed from one to another or pumped by pumps as described herein.

The carbonaceous material and acid mixture solution may then be fed into one of the digestion vessels 308 and 310 where the carbonaceous material is further digested. The digestion vessels 308 and 310 also include heaters 324 and 326, respectively, and mixers 322 and 326, respectively. The heaters 314, 324, and 326 are used to maintain the temperature of the digestion of the carbonaceous material in the digestion vessels 304, 308, and 310. The heaters may be steam fed heat exchangers as are commonly known in the art.

By having downstream digestion vessels 308 and 310, the carbonaceous material/acid solution mixture may be further digested while a new batch is being loaded into digestion vessel 304. Additionally, if a carbonaceous material/acid solution mixture is not in specification, it may be dumped to one of the digestion vessels 308 and 310 for further treating without holding up the digestion in the digestion vessel 304. Further, the carbonaceous material/acid mixture solution may be then moved or pumped to digestion vessel 310, which may be used to further the digestion of the carbonaceous material/acid mixture solution or may be used as a hold, stage, or surge vessel for feeding a centrifuge 328 via pipe 330, which may have a capacity or volume that is less than the digestion vessels 304, 308, and 310.

In one embodiment, the digestion vessels 304, 308, and 310 further include condensation loops or circuits 348 that may take any acid mixture solution that is vaporized in the digestion vessels 304, 308, and 310. The condensation circuits 348 may include condensation units, such as coolers, for condensing the vapor or gaseous acid mixture solution for storing in the present system for refining carbonaceous material Separators, commonly known in the art, may further be used to separate the different components or compounds of the acid mixture solution. In another embodiment, catalyst beds may be used with the condensation circuits 348. In one aspect, the acid mixture solution may contain multiple acid compounds, such as HF and $H_2SiF_6$, that may be separated from each other by use of temperature controlled separators that separate the different compounds by temperature specific distillation. This separation may be controlled by controlling the temperature and ratio of the acid compounds within the separators. In addition, the metals digested out of the carbonaceous material may be precipitated at different pH levels and then filtered from the carbonaceous material/acid mixture solution.

In the above described embodiment, the present system for refining carbonaceous material may include multiple digestion vessels that are in series, one feeding the carbonaceous material/acid mixture solution to another downstream digestion vessel. In this embodiment, the carbonaceous material/acid mixture solution may be batched in a way to have a continuous flow downstream, which may be important for feeding a continuous centrifuge 328 via pipe 330, for example.

In another embodiment, the present system for refining carbonaceous material may include one digestion vessel by itself, such as digestion vessel 304. In this embodiment, no further downstream digestion vessels are fed the carbonaceous material/acid mixture solution and it is fed directly to a centrifuge 328, for example.

In yet another embodiment, the present system for refining carbonaceous material may include multiple digestion vessels that are in parallel that feed concurrently or simultaneously the carbonaceous material/acid mixture solution to the centrifuge 328, for example. In this embodiment, the digestion vessels 304, 308, and 310 are each individually fed the carbonaceous material/acid mixture solution from the conveyor 302.

Preferably, the acid mixture solution comprises HF and $H_2SiF_6$ in a range of proportions. In one example, the HF is present in a range preferably from about 2% to about 20% w/w, and more preferably from about 5% to about 15% w/w. The $H_2SiF_6$ is present in a range preferably from about 10% to about 58% w/w. Preferably, the HF is present in a range of from about 5% to about 12% w/w, and more preferably in the range of from about 8% to about 10% w/w and the $H_2SiF_6$ is present in a range preferably from about 30% to about 38% w/w, and more preferably from about 22% to about 32% w/w. The balance of the mixture is water. So for example, an acid mixture solution that includes 10% HF and 35% $H_2SiF_6$ will have a $H_2O$ content of 55% taking into account the moisture of the carbonaceous material being fed into the digestion vessels, in one aspect. Preferably, the acid mixture solution includes these mixed portions of HF and $H_2SiF_6$ prior to mixing them with the carbonaceous material.

In another embodiment, a fluorine acid solution can be prepared from a solution of $H_2SiF_6$ plus $H_2O$ as the base acid to which anhydrous HF acid is added so that both of these reactive acids are in one solution. Some exemplary ranges of the acids are from about 5%-34% w/w $H_2SiF_6$, 32%-90% w/w $H_2O$, and 5%-34% w/w HF acid. In one aspect, a fluorine acid solution is prepared from a saturated solution of $H_2SiF_6$ in water and adding gaseous anhydrous HF acid. In another embodiment, $SiF_4$ may be reacted with $H_2O$ to form $H_2SiF_6$.

In one embodiment, the digestion vessels 304, 308, and 310 may be operated at temperatures of from about 10° C. to about 125° C. and at a pressure of from about 0 kPa to about 105 kPa. In another embodiment, the temperature of the digestion vessels 304, 308, and 310 may be preferably in the range of from about 55° C. to about 85° C., and more preferably in the range of from about 70° C. to about 85° C.

In one embodiment, the carbonaceous material/acid mixture solution is agitated or stirred in the digestion vessels 304, 308, and 310 for preferably from about 20 to about 80 minutes, and more preferably from about 40 to about 60 minutes.

The digestion vessels 304, 308, and 310 may be made of a material that withstands the chemicals contained in them. For example, the digestion vessel 304 may be made from a blend of plastic and carbon fiber composites or any structural material lined with any material that is impervious to the corrosive effects of the acid used.

The treated carbonaceous material has a specific gravity lower than the carbonaceous material/acid mixture solution, thus the treated carbonaceous material may float to the top of the carbonaceous material/acid mixture solution in the digestion vessels 304, 308, and 310 when the mixers 312, 322, and 324 are turned off. Unreacted iron sulfide and other un-dissolved heavy metal salts whose specific gravities are greater than the acid mixture solution may fall to the bottom of the digestion vessels 304, 308, and 310 if the agitation is stopped by turning off the mixers 312, 322, and 324. In one embodiment, the specific gravity of certain carbonaceous material, such as coal, is approximately 1.3 and the acid mixture solution is approximately 1.2 when entering the digestion vessel. After digestion, the carbonaceous material then typically has a specific gravity of 1.1 and the specific gravity of acid solution is 1.2 entering the centrifuge 328. In addition, during the separation process, the treated carbonaceous material acts as a filter to the metal fluorides and/or metal fluorosilicates that are contained in the acid mixture solution.

In one embodiment, the pipe 330 is connected to a pump 332 that pumps the carbonaceous material/acid mixture solution to the centrifuge 328. Preferably, the pump 332 pumps the carbonaceous material/acid mixture solution without degrading the particle size. In one aspect, the pump 332 is a peristaltic pump.

In one aspect, the centrifuge 328 may include several different stages. For example, it may spin at a speed sufficient to remove the acid mixture solution from the carbonaceous material in a first stage. In a second stage, water supplied from a de-ionized water supply 336 and/or a rinse water supply 334 may be used in washing the carbonaceous material. Preferably, this rinse water may be applied to the carbonaceous material while it is being spun inside of the centrifuge 328. The water used in this cycle may be heated before it is input into the centrifuge 328. For example, the water may be in a temperature preferably from about 30° C. to about 100° C., and more preferably 75° C. to about 85° C. Then, the centrifuge 328 may remove this wash water where it can be recycled after being filtered through a filtration apparatus in this second stage. The rinse water that is removed from the centrifuge 328 is sent for recycling via pipe 342 as described below. In another embodiment, the wash water removed from the centrifuge 328 may be sprayed on the carbonaceous material prior to it entering the digestion vessels 304, 308, and 310 in the moisture balancing unit 346 as the moisture content of the incoming carbonaceous material is lower than desired prior to digestion as described herein. The filtration apparatus removes some of the metal fluorides and metal chlorides, which may be sold to other markets, such as aluminum and steel plants.

Preferably, the third stage includes injecting steam into the centrifuge 328 during a spinning process. In one embodiment, the temperature within the centrifuge 328 is preferably from about 120° C. to about 400° C. and the quantity of steam that is applied to the carbonaceous material in the centrifuge 328 may be determined by several factors, including the size or carbonaceous material particles and the speed of drum inside the centrifuge 328 to prevent slumping of the carbonaceous material within the centrifuge 328. The steam helps in removing any residual fluorides. For example, the amount of steam applied to the carbonaceous material may be determined by the residual level of fluorine required in the finished carbonaceous material. For instance, an isotope of HF, $H_2SiF_6$, and $H_2O$ may vaporize preferably from about 105° C. to about 120° C. depending on the concentrations of the individual compounds. Thus, by providing steam into the centrifuge 328 the residual HF, $H_2SiF_6$, and $H_2O$ are driven off of the carbonaceous material as a vapor and recovered later via pipe 342, for example, the steam process may also start the drying stage of the present system for refining carbonaceous material.

The centrifuge 328 may further include scrapers that remove the carbonaceous material from the centrifuge 328 by scraping the carbonaceous material as it is spinning inside the centrifuge 328. Thus, the carbonaceous material exits the centrifuge 328; the carbonaceous material is then moved to a hopper 344 via a conveyor. In one aspect, it may be important not to use any conveyance means that will degredate the carbonaceous material to prevent the creation of smaller undesirable fines. The moisture content of the carbonaceous material at this point may be from about 4% to about 12% w/w.

Figure 5:
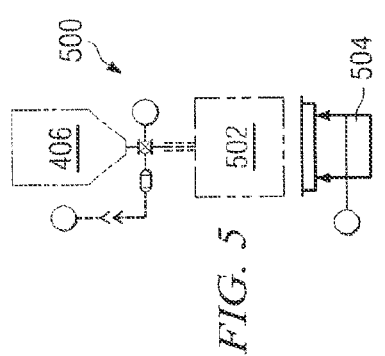
FIG. 5 illustrates a schematic diagram of a packaging and product unit according to an embodiment of the present invention.
Figure 4:
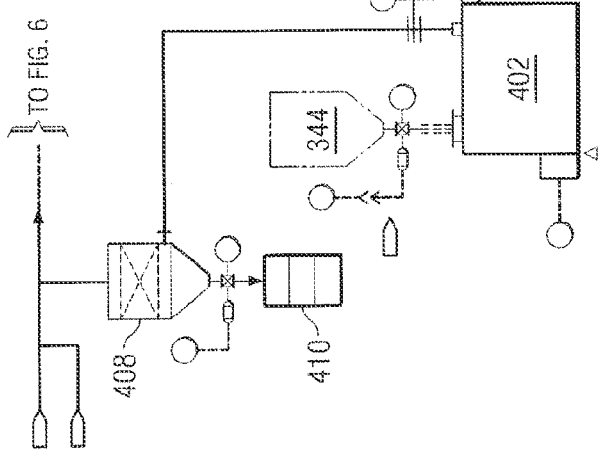
FIG. 4 illustrates a schematic diagram of a fluidized bed dryer unit according to an embodiment of the present invention.

FIG. 4 illustrates an embodiment 400 of a drying unit according to the present invention. The drying unit 400 includes a dryer 402 that may further dry the carbonaceous material produced by the digestion unit 300. The carbonaceous material from the hopper 344 is fed into the dryer 402 where the carbonaceous material is subject to air flow of a desired velocity and temperature. After a residence time the carbonaceous material then exits the dryer 402 and is fed to a hopper 406 where it may be elevated above a final packaging and product unit 500 that may include a load cell or scale 504 for weighing the finished carbonaceous material that is placed in a storage container 502 as shown in FIG. 5, or sent to bulk storage, where the almost pure and dried carbonaceous material is ready for the next stage, fuel, activation and the like.

In one embodiment, dryer 402 may be a fluidized bed that is generally a density dependent unit, like a teeter bed, that has air flowing from the bottom to the top of the fluidized bed dryer that pulls the lighter carbonaceous material out the top of the fluidized bed dryer for transfer to drum 410 by a cyclone 408. The carbonaceous material particles are suspended in the air flow based on their density and are dried further by this process. The medium-sized carbonaceous material particles that do not flow out the top of the fluidized bed dryer are recovered at the bottom of the fluidized bed dryer for transfer on conveyor 404. The fluidized bed dryer includes a weir that controls the height of carbonaceous material inside the fluidized bed dryer. Conveyor 404 may be a vacuum conveyor as is known in the art. In one aspect, the smaller-sized carbonaceous material particles that exit the top of the fluidized bed dryer may be approximately 200 microns or smaller. To control the separation of the particle sizes through the fluidized bed dryer, the air flow may be adjusted. A higher air flow through the fluidized bed dryer will produce larger-sized carbonaceous material particles exiting the top of the fluidized bed dryer, while a lower air flow will produce smaller-sized carbonaceous material particles exiting the top of the fluidized bed dryer. In addition, the smaller-sized carbonaceous material particles may be fed into storage container, such as sacks and the like.

In another embodiment, the dryer 402 may be a number of designs so long as there is air flow and carbonaceous material movement, the temperature of the dryer 402 may be preferably in the range from about 100° C. to about 160° C., more preferably from about 120° C. to about 140° C., the temperature may be high enough to drive off most of the moisture and some of the tars in order to liberate the residual fluorine to a level close to the inherent value of the original carbonaceous material.

Figure 6:
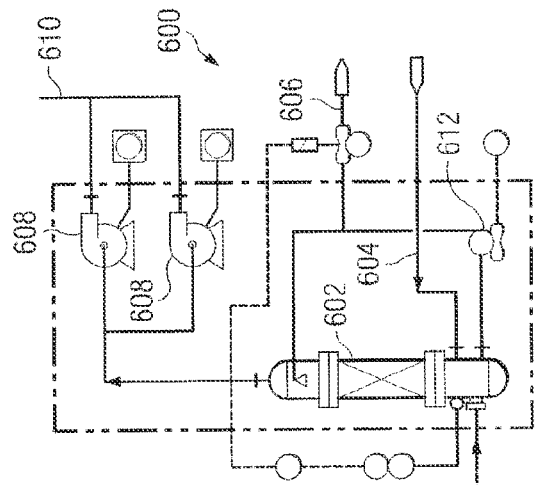
FIG. 6 illustrates a schematic diagram of a vapor recovery unit according to an embodiment of the present invention.

FIG. 6 illustrates an embodiment 600 of a vapor recovery unit 600 according to the present invention. The process water produced by the system for refining carbonaceous material may be fed to a scrubber 602 where air is pulled through the scrubber 602 to remove any additional light volatile vapors from the process water. The air flow through the scrubber 602 is provided by blowers 608 which are fed to a stack 610. The stripped process water may be returned to the top of the scrubber 602 via pump 612. Additionally, the stripped process water may be fed to the moisture balancing unit 346 to be used as a feedstock for increasing the moisture content of the carbonaceous material within the moisture balancing unit 346.

Figure 7:
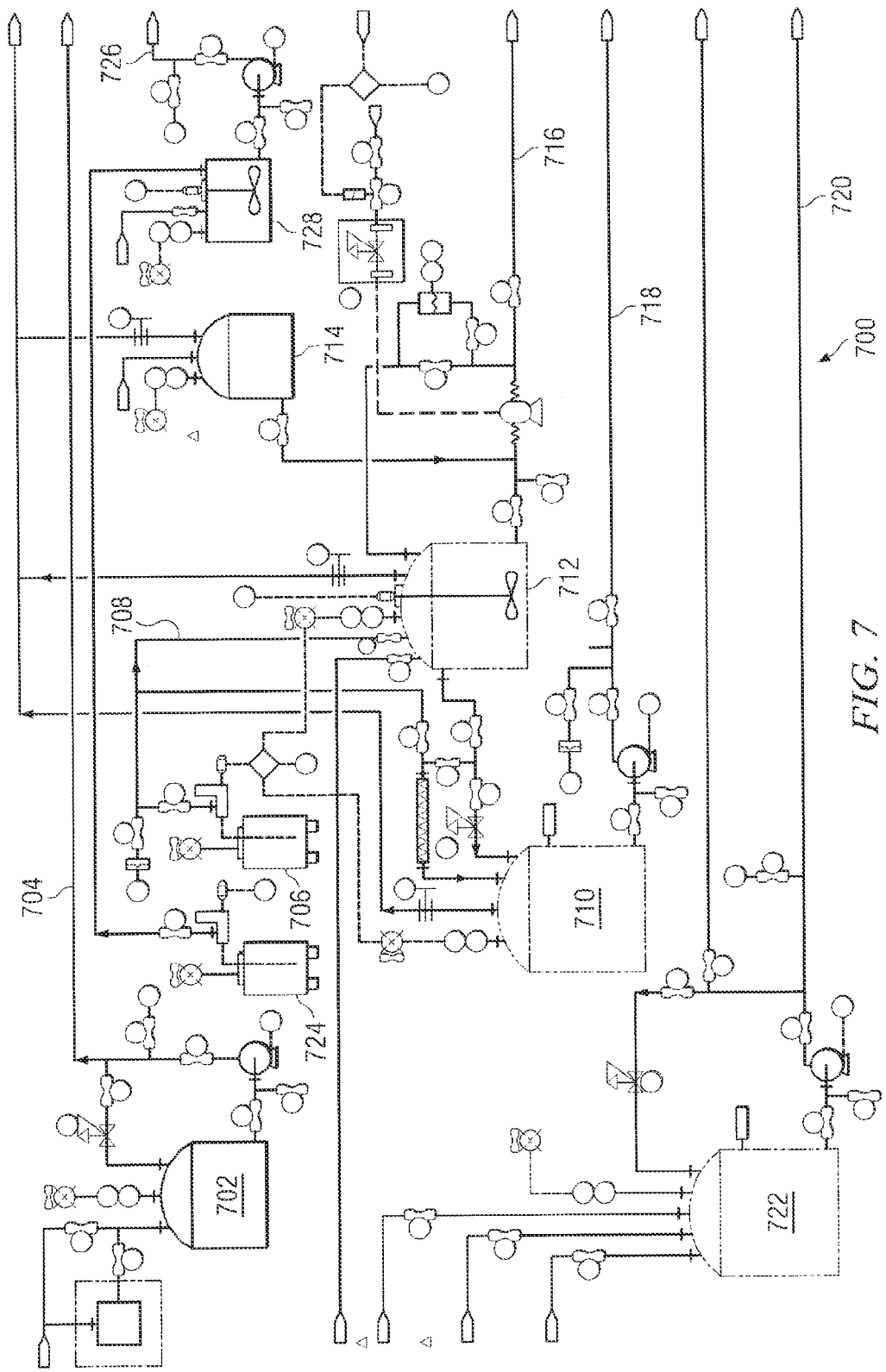
FIG. 7 illustrates a schematic diagram of a feedstock storage unit according to an embodiment of the present invention

FIG. 7 illustrates an embodiment 700 of a feedstock storage unit according to the present invention. The feedstock storage unit 700 includes a de-ionized water storage tank 702 for holding de-ionized water that is used in the system for refining carbonaceous material. For example, de-ionized water is fed from de-ionized water storage tank 702 to centrifuge 328 via pipe 704. Feedstock storage unit 700 further includes a HF storage tank 706 that feeds HF acid via pipe 708 to a HF adjustment tank 710 and a $H_2 SiF_6$ adjustment tank 712 may further include heaters to heat their respective acid mixture solutions after blending the acid mixture solution to a desirable strength. The $H_2SiF_6$ adjustment tank 712 may further be fed $H_2SiF_6$ in a more concentrated form that is stored in a $H_2SiF_6$ storage tank 714. Once the desired strength of acid mixture solution is achieved, then it is piped via pipe 716 to digestion vessel 304 for mixing with carbonaceous material. In addition, HF adjustment tank 710 may feed a reduced strength of HF to the centrifuge 328 via pipe 718. Also, feedstock storage unit 700 may further include a rinse water collection tank 722 that contains rinse water collected from the system for refining carbonaceous material. This rinse water may be fed to centrifuge 328 via pipe 720. Additional vessels 724 and 728 may be used to contain caustic compounds, such as bases, for neutralizing any acid spills or reducing the strengths of the acids of the system for refining carbonaceous material. Such bases may be fed to the digestion vessel 304 via pipe 726.

Figure 8:
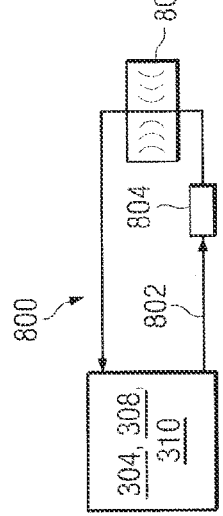
FIG. 8 illustrates a schematic diagram of an ultrasonic unit according to an embodiment of the present invention.

FIG. 8 illustrates an embodiment 800 of an ultrasonic unit according to the present invention. In one embodiment, the digestion vessels 304, 308, and 310 may include a pipe 802 that takes a stream of the carbonaceous material/acid mixture solution and pumps it through the pipe 802 through a source of ultrasonic waves 804 for improved penetration of the acid mixture solution into the micropores and macropores of the carbonaceous material. In one aspect, the source of ultrasonic waves 804 may be a water bath that is subject to a source of such ultrasonic waves, thus imparting the ultrasonic waves through the pipe 802 for improved penetration of the acid mixture solution. In one embodiment, the wave signals are square to improve such penetrating and digesting action.

Figure 9:
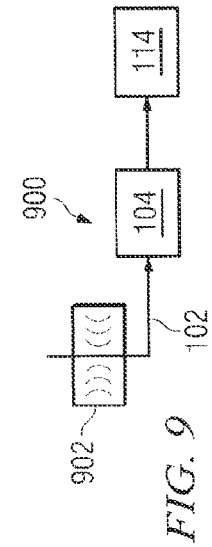
FIG. 9 illustrates a schematic diagram of an ultrasonic unit according to another embodiment of the present invention.

FIG. 9 illustrates an embodiment 900 of an ultrasonic unit according to the present invention. In this embodiment, a source of ultrasonic waves 902 is placed upon the pipe 102 prior to entering the vibratory screen unit 104.

In one embodiment, the frequency of the source of ultrasonic waves 804 and 902 is from about 80 KHz to about 100 KHz. In one example, an opening of a macropore of carbonaceous material may be approximately 1 micron and it has been found that a frequency of 100 KHz source of ultrasonic waves 804 and 902 will cause the acid mixture solution to penetrate the macropore opening. Additionally, as the acid mixture solution is pumped into the macropores of the carbonaceous material, pressure is created within the macropore causing the acid mixture solution to be pumped out once the pressure becomes greater within the macropore than outside the macropore. This pumping action provides for improved penetration and digestion of contaminants of the carbonaceous material. The source of ultrasonic waves 804 and 902 may be generated by ultrasonic transducers as well known in the art. In one aspect, these transducers may be in contact or communication with a water bath, which transfers the wave action to the water, which then transfers the wave action to the pipe, and so on, to provide the pumping action to the micropore and macropores of the carbonaceous material. This reduces the need for mechanical agitation and provides for improved digestion times. The frequency of the source of ultrasonic waves 804 and 902 causes cavitations, cavitation bubbles, and/or cavity bubbles within the acid mixture solution such that they are the size or smaller than the typical openings of the macropores of the carbonaceous material. In general, the higher the frequency the smaller the cavitation bubbles. If the cavitation bubbles are too large, they may tend to pulverize the carbonaceous material to smaller sizes that may not be desirable to the process. In one embodiment, source of ultrasonic waves 804 and 902 are capable of producing power from about 250 watts to about 16,000 watts with a frequency of from about 10 KHz to about 50 KHz. The ultrasonication may be performed at an increased pressure over ambient pressure using a feed pump and adjustable back-pressure valve next to the pipe where it is desired to operate.

Figure 10:
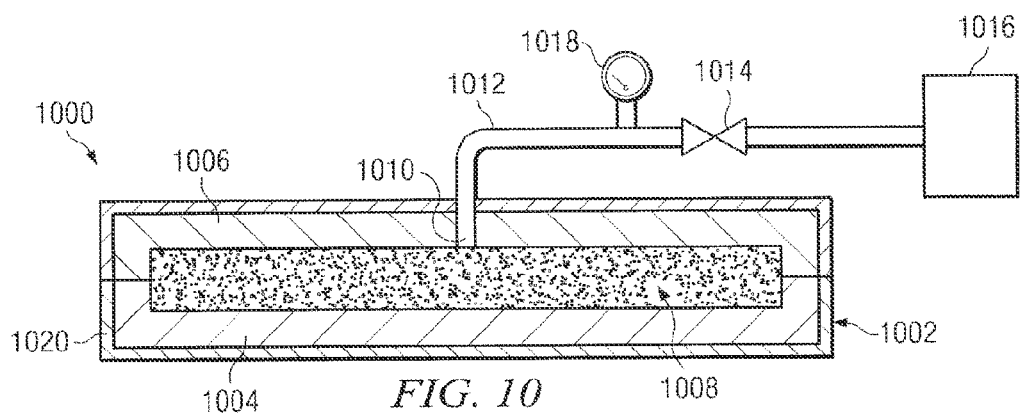
FIG. 10 illustrates a cross-sectional view of an exemplary mold containing amorphous digested coal for making carbon foam anodes according to an embodiment of the present invention.

In addition to the aforementioned aspects and embodiments of the present system for refining carbonaceous material, the present invention further includes a system for making carbon foam anodes. FIG. 10 illustrates an embodiment 1000 of a mold 1002 containing an amorphous digested coal 1008. In one aspect, the mold 1002 may be a multi-part mold and include a bottom portion 1004 and a top portion 1006. As is known to those skilled in the art, the mold 1002 may be taken apart such that the bottom portion 1004 and top portion 1006 are separated for inserting the amorphous digested coal 1008 prior to or after the molding process. The supply and size of digested coal 1008 may be provided by the present system for refining carbonaceous material as described herein. The digested coal 1008 contains a decreased amount of impurities, minerals, and contaminants because it has been digested and prepared according to the system for refining carbonaceous material as described herein. The mold further may include a heating element 1020 for heating the mold to a desired temperature according to the conditions herein described.

The mold 1002 further includes an inlet 1010 for providing a vacuum and/or pressure to the interior of the mold 1002 as shown and displaced by the digested coal 1008. The inlet 1010 preferably is connected to a tube 1012 that is in communication with a negative pressure (vacuum) and/or pressure source 1016 for providing a vacuum and/or positive pressure (pressure) condition to the interior of the mold 1002. In addition, the tube 1012 may further include a vacuum and/or pressure gauge 1018 and a valve 1014 for controlling the vacuum or pressure to the interior of the mold 1002 as is commonly known to those skilled in the art.

In one embodiment, the vacuum and/or pressure source 1016 may be a unit that is capable of producing negative pressure and positive pressure conditions within the mold 1002. Such a source may be known devices and/or apparatuses that provide a positive pressure to the inside of the mold 1002 as described herein. After such positive pressure has been applied to the inside of the mold 1002, then the vacuum and/or pressure source 1016 provides a negative pressure within the mold 1002 as described herein. In one aspect, the vacuum and/or pressure source 1016 may be a single unit, device, and/or apparatus that is commonly known in the arts. In another aspect, the vacuum and/or pressure source 1016 may be multiple units, devices, and/or apparatuses that provide individually or separately negative pressures and positive pressures to the inside of the mold 1002.

Additionally, although a single tube 1012 is shown, additional tubes 1012 may be used, each connected to a separate vacuum and/or pressure source 1016. For example, one tube 1012 may be connected to a vacuum and/or pressure source 1016 that provides positive pressure to the inside of the mold 1002 and another tube 1012 may be connected to a vacuum and/or pressure source 1016 that provides a negative pressure to the inside of the mold 1002. Further, additional vacuum and/or pressure gauges 1018 may be used, each connected to a separate tube 1012, for providing pressure readings in their respective tubes 1012.

Likewise, the mold 1002 may include separate inlets 1010 for connecting to separate tubes 1012, such as one to a negative pressure source and another to a positive pressure source. In such a embodiment, a separate vacuum and/or pressure gauges 1018 may be connected to each separate tube 1012 for providing a reading of the pressure within their respective tubes 1012.

Preferably, the bottom portion 1004 and top portion 1006 of the mold 1002 are made from a material suitable for the temperatures and pressures described herein, some exemplary materials being metals, metal alloys, stainless steel and the like. In addition, the mold 1002 may be shaped or formed to any desirable volume or shape to accommodate and provide a carbon foam anode having that desired shape or form. For example, the mold 1002 may be shaped to produce rectangular anodes or U-shaped anodes, for example.

In one embodiment, the heating element 1020 is capable of heating the interior of the mold 1002 to temperatures from about 0° C. to about 3,000° C. The heating element 1020 may be any heating element as is commonly known in the art to supply the sufficient amount of heat to the mold 1002. In one aspect, the heating element may also be multi-part so as to enable the mold 1002 to be separated such as from the bottom portion 1004 from the top portion 1006. The heating element 1020 may provide stepped or programmed heating to the mold 1002.

In one embodiment, the vacuum and/or pressure source 1016, valve 1014, tube 1012, and inlet 1010 provide positive pressure within the interior of the mold 1002 from about one atmosphere to about 10 atmospheres or more. In one alternative, increasing the pressure in the interior of the mold includes increasing the pressure from about 6 atmospheres to about 8 atmospheres. These components are further capable of providing an initial pressure within the mold 1002 of up to approximately ten atmospheres within the interior of the mold until it reaches its desired maximum temperature. Additionally, these components are capable of maintaining for a desired amount of time an initial pressure within the mold 1002 of up to approximately 10 atmospheres after the mold 1002 has reached its desired maximum temperature.

In another embodiment, the vacuum and/or pressure source 1016, valve 1014, tube 1012, and inlet 1010 provide pressures within the interior of the mold 1002 of from about one atmosphere to about zero atmospheres or less. These components are further capable of providing this negative pressure within the mold 1002 from about one atmosphere to about zero atmosphere within approximately 10 seconds or less upon the mold 1002 reaching its desired maximum temperature. More preferably, these components are capable of providing an such a negative pressure within the mold 1002 of from about one atmosphere to about zero atmosphere to the interior of the mold 1002 within 6 seconds or less upon it reaching its desired maximum temperature as described herein.

In one embodiment, the digested coal 1008 is placed into the mold 1002 by opening up the mold 1002 and placing the digested coal 1008 within its interior. Then, the bottom portion 1004 and the top portion 1006 of the mold 1002 may be joined back together with the digested coal 1008 within its interior. In another aspect, mold 1002 may contain an inlet for inserting the digested coal 1008 for those instances when mold 1002 is not a multi-part mold. For example, the inlet 1010 may be used as an inlet for the digested coal 1008 once the mold 1002 is sealed.

In one embodiment, the vacuum and/or pressure source 1016 being operated by valve 1014 through tube 1012 and inlet 1010 applies a positive pressure of up to approximately 10 atmospheres to the interior of the mold 1002. At this point, the heating element 1020 applies heat to the mold 1002 in preferably a stepped or ramped program to a desired temperature of from approximately 200° C. to about 700° C., and more preferably from about 380° C. to about 500° C. Once the mold 1002 has reached a desired temperature, the vacuum and/or pressure source 1016 being operated by valve 1014 through tube 1012 and inlet 1010 may apply a vacuum or negative pressure to the interior of the mold 1002 within a desired period of time. In one aspect, this negative pressure may be from about one atmosphere to about zero atmosphere and the desired period of time to provide such a pressure may be from less than one second to more than 30 seconds, preferably from about 10 seconds to about 2 seconds, and more preferably from about 4 seconds to about 7 seconds. At this time, the coal becomes an ungraphitized carbon foam anode 1102.

Figure 11:
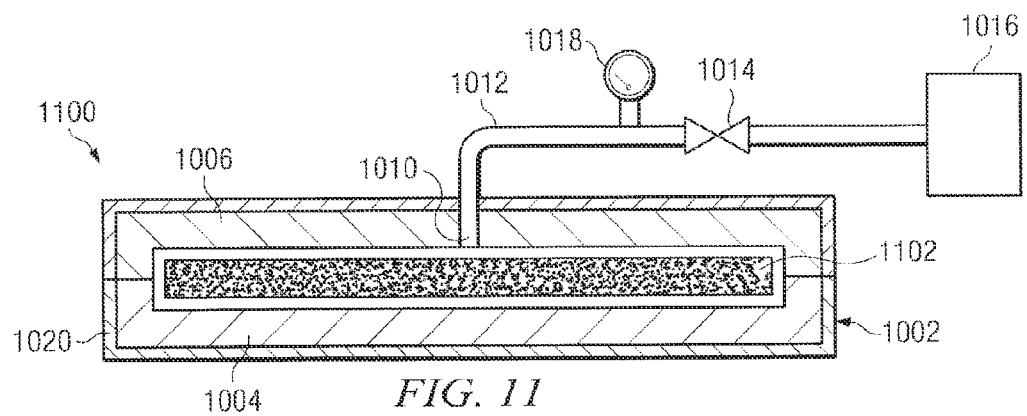
FIG. 11 illustrates a cross-sectional view of an exemplary mold containing an ungraphitized carbon foam anode according to an embodiment of the present invention.

FIG. 11 illustrates an embodiment 1100 of mold 1002 containing the ungraphitized carbon foam anode 1102. By the operation of the mold 1002 as described herein, the digested coal is formed into the desired shape of the ungraphitized carbon foam anode 1102. At this point, the ungraphitized carbon foam anode may be removed from the mold 1002 by separating the bottom portion 1004 from the top portion 1006 of the mold 1002 and removing the ungraphitized carbon foam anode 1102 from the mold 1002. This may be done to graphitize the ungraphitized carbon foam anode 1102 as further described below. In another embodiment, the ungraphitized carbon foam anode 1102 is not removed from the mold 1002 prior to the graphitization process as described herein, but rather the mold 1002 containing the ungraphitized carbon foam anode 1102 is subjected to the graphitization processes and temperatures described herein to produce a graphitized carbon foam anode 1204 after which the graphitized carbon foam anode 1204 may be removed from the mold 1002.

Figure 12:
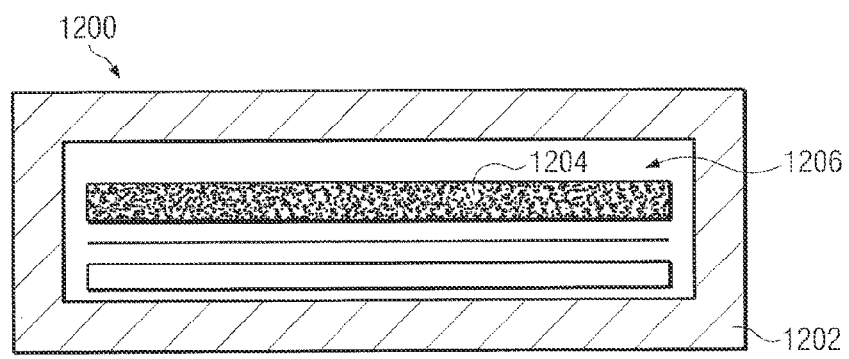
FIG. 12 illustrates a cross-sectional view of an exemplary graphitization oven for making carbon foam anodes according to an embodiment of the present invention.

FIG. 12 illustrates an embodiment of a graphitization oven 1202 and graphitized carbon foam anode 1204. In this embodiment, the ungraphitized carbon foam anode 1102 has been removed from the mold 1002 and placed in the graphitization oven 1202 and graphitized to produce the graphitized carbon foam anode 1204. In another embodiment, the mold 1002 is placed in the graphitization oven 1202 and subjected to the graphitization temperatures described herein. Preferably, the graphitization oven is capable of producing temperatures in a stepped or ramped format to its interior 1206 or to the interior of mold 1002 when it is placed in the graphitization oven 1202. In one embodiment, the graphitization oven 1202 produces ramp temperatures from approximately ambient temperature to approximately 3,000° C. and more preferably to 2,600° C. In one aspect, the ungraphitized carbon foam anode 1102 is subjected to this ramped or stepped temperature program up to approximately 2,600° C. In addition, the graphitization oven 1202 is capable of holding at any desired temperature such as near or around 2,600° C. The stepped program of the graphitization oven provides temperature and time so that the carbon atoms of the ungraphitized carbon foam anode 1102 realign, thus providing graphitized carbon foam anode 1204.

In one embodiment, the graphitized carbon foam anode 1204 may shrink in size due to the graphitization process. For example, in an ungraphitized carbon foam anode 1102 having a particular shape and size may shrink approximately 15% during graphitization in the graphitization oven 1202. Thus, in one aspect, the ungraphitized carbon foam anode 1102 may be of a particular size such as 15% larger than the desired final product or graphitized carbon foam anode 1204 to compensate for such shrinkage. Generally, the shrink rates along any particular axis are dependent upon the thickness of the ungraphitized carbon foam anode material along that axis. Thus, these thicknesses may be taken into account to design the initial mold 1002 to be of the size of approximately 15%, larger or smaller, depending on the digested carbon 1008 placed within it.

Figure 13:
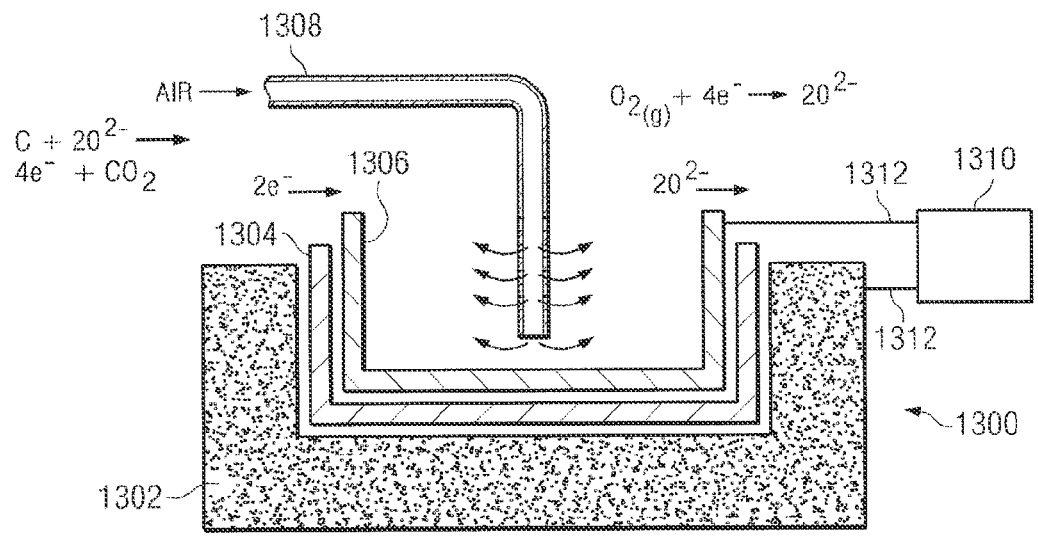
FIG. 13 illustrates a cross-sectional view of an exemplary carbon fuel cell according to an embodiment of the present invention.

FIG. 13 illustrates an embodiment 1300 of a carbon fuel cell. Carbon fuel cell 1300 includes a carbon foam anode 1302, an electrolyte layer 1304 and a cathode 1306, with the electrolyte layer 1304 interspersed between the cathode 1306 and the carbon foam anode 1302. In addition, as is shown, a supply of air is provided through air supply 1308 which terminates preferably in a fitted or vented arrangement, thus providing air to the interior of the carbon fuel cell 1300. Additionally, a load 1310 is connected to the cathode 1306 and a carbon foam anode 1302 via contacts 1312. The air supply 1308 provides a source of diatomic oxygen to the interior of the carbon fuel cell 1300. The chemical potential difference of oxygen across the solid oxide electrolyte layer 1304 is a measure of the open circuit potential given by the Nernst equation, $E=(RT/nF)\ln(PO_2'/PO_2'')$, where E is the equilibrium potential of a carbon fuel cell under open circuit conditions, R is the gas constant, F is Faraday's constant, N is the number of electrons per mole in the case of oxygen, N equals 4, and $PO_2$ denotes the partial pressure of oxygen.

Although carbon fuel cell 1300 in FIG. 13 depicts a cross-section of a U-shaped carbon foam anode 1302 and related electrolyte layer 1304 and cathode 1306, any shape or form of carbon foam anode and related components may be used in the present invention. In addition, any of these components may provide the mechanical integrity for the carbon fuel cell 1300. For example, another typical schematic for a carbon fuel cell may involve flat or corrugated plates or multi-layered ceramic membrane assemblies. Other cell geometries, including flat tubes, rectangular or square tubes and plantar configurations, may also be used in accordance with the present invention.

In one embodiment, the electrolyte layer 1304 is preferably a thin, impervious layer of material and may be coated on the outer surface. In one embodiment, the electrolyte layer 1304 is an impervious layer of yttria stabilized zirconia (YSZ). In another aspect, the cathode 1306 may be made of a mixed conducting perovskite. In another embodiment, the electrolyte layer 1304 may be a scandia stabilized zirconia (SSZ). Further, it is possible to employ tetragonal zirconia, which is known to possess higher conductivity and better thermal shock resistance than cubic zirconia electrolytes. Similarly, other oxide ion conductors such as doped cerates [e.g. $Gd_2O_3 \cdot CeO_2$] and doped gallates, such as $La_2O_3 \cdot Ga_2O_2$, may also be used for the thin electrolyte layer 1304.

Preferably, the inner surface of the cathode 1306 is in contact with the air provided by the air supply 1308 to furnish oxygen needed for the oxidation reaction at the carbon foam anode 1302, while the outer surface of the carbon foam anode may be in contact with additional support membrane, structures or fuels. In one embodiment, the electrolyte layer 1304 serves as a selective membrane for transporting oxygen ions from the air, leaving behind the nitrogen. The oxygen picks up electrons from the external circuit through the cathode 1306 and is reduced to oxide ions which are then incorporated into the electrolyte layer 1304.

While the electrons migrate under the influence of a chemical potential gradient through the electrolyte layer 1304 from the carbon foam anode 1302 to the cathode 1306, oxygen ions are transported in the reverse direction from the cathode 1306 to the carbon foam anode 1302 where they participate in the electrochemical oxidation of the carbon foam anode 1302. The electrons released during the oxidation reaction at the carbon foam anode 1302 travel through the external circuit towards the cathode 1306, producing the electricity through the contacts 1312 and load 1310.

Figure 14:
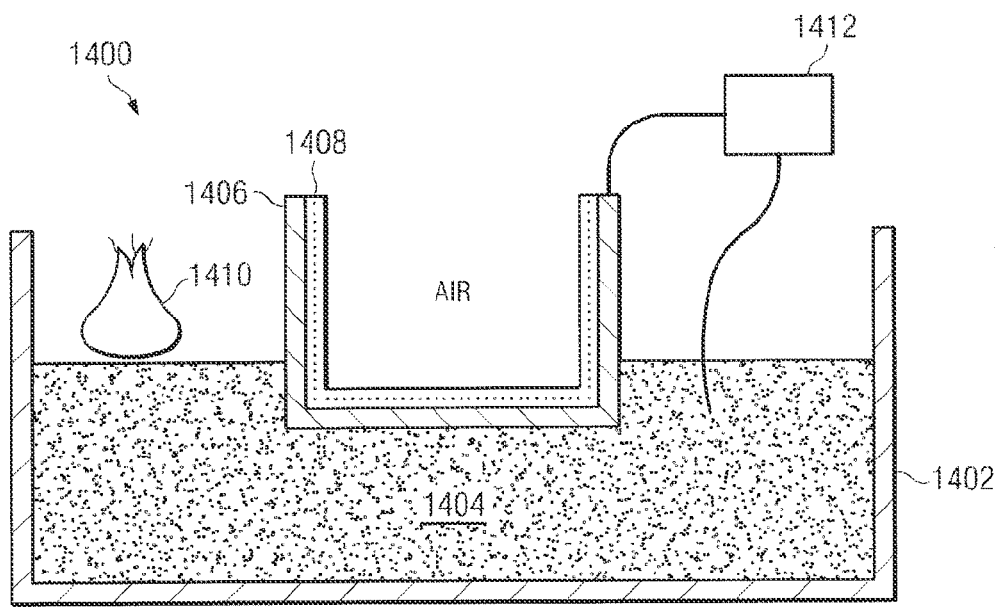
FIG. 14 illustrates a cross-sectional view of an exemplary carbon fuel cell according to another embodiment of the present invention.

FIG. 14 illustrates an another embodiment 1400 of a carbon fuel cell including a container or vessel 1402 for holding a molten carbon anode 1404 according to the present invention. In this embodiment, the digested coal as produced by the present invention is heated to a temperature where it is a molten state and contained within the vessel 1402. In addition, an electrolyte layer 1406 and cathode 1408 are inserted into the carbon anode 1404 for providing electricity to load 1412 via contacts 1414. In addition, the molten carbon anode 1404 may further include a sequestering agent. Further, additional digested coal may be added to the molten carbon anode 1404, such as digested carbon addition 1410 which may be in any convenient container or sack designed for insertion into the molten carbon anode 1404. In one aspect, the digested carbon addition 1410 may be granulated or fragmented portions of the digested coal as described herein.

Figure 15:
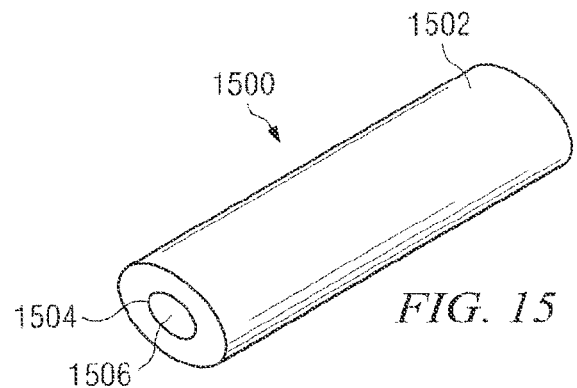
FIG. 15 illustrates a perspective view of an exemplary carbon foam anode having an center core containing a conducting electrode located therein according to an embodiment of the present invention.

FIG. 15 illustrates an embodiment 1500 of a carbon foam anode that has been cored out or drilled through the center to provide a space for an electrode, such as a metallic electrode (e.g. copper) or metal allow electrode, to be inserted in the middle of the carbon foam anode. In this embodiment, the anode is drilled to produce a central axial cavity 1504 where the electrode 1506 may be inserted there-through.

Figure 16:
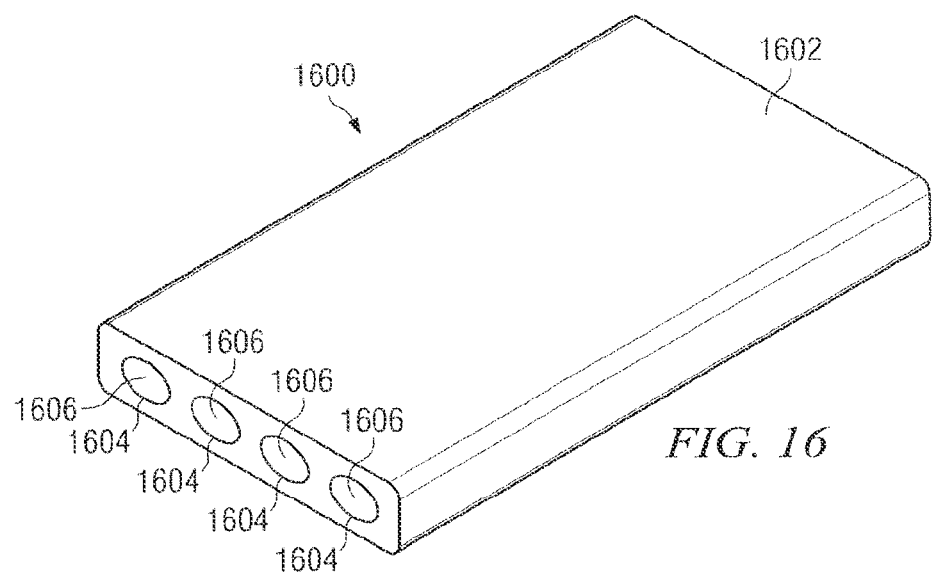
FIG. 16 illustrates a perspective view of an exemplary carbon foam anode having a plurality of center cores each containing a conducting electrode located therein according to another embodiment of the present invention.

FIG. 16 illustrates an embodiment 1600 of another example of a carbon foam anode 1602 that has a plurality of electrodes through the center of it. Carbon foam anode 1602 may have plurality of these central cavities 1604 that are drilled through the center of the carbon foam anode 1602, where the electrode 1606 may be inserted therein.

Figure 17:
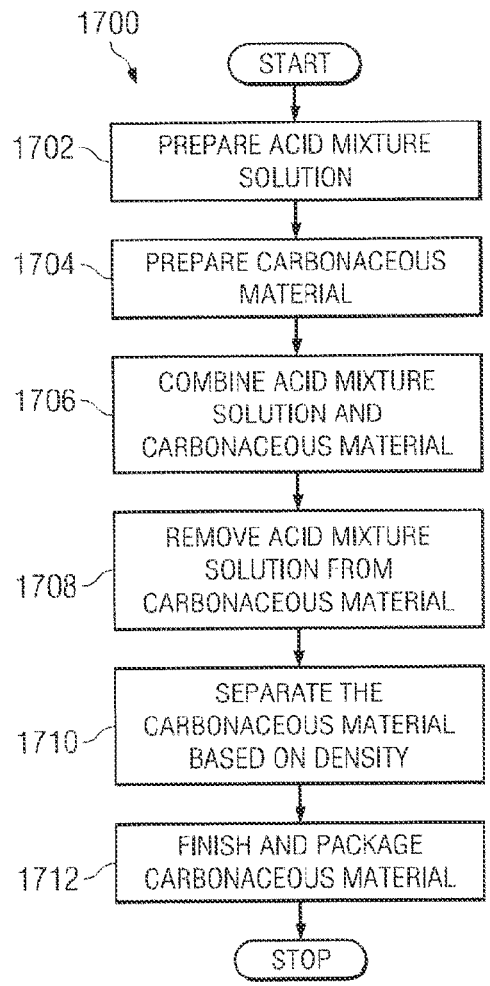
FIG. 17 illustrates a flow diagram for an exemplary process for refining carbonaceous material according to an embodiment of the present invention.

In addition to the aforementioned aspects and embodiments of the present system for refining carbonaceous material, the present invention further includes methods for refining carbonaceous material. FIG. 17 illustrates an embodiment 1700 of a method for refining carbonaceous material. In step 1702, an acid mixture solution is prepared by mixing HF, $H_2O$, and $H_2SiF_6$ to a desired proportion. In this step, stored concentrated HF and $H_2SiF_6$ may be individually pumped to individual vessels where the concentration of each is reduced with water or a base. Then, these reduced concentrations of the HF and $H_2SiF_6$ may be combined into a vessel that then mixes and heats the mixture of HF, $H_2SiF_6$, and $H_2O$. In this step the exact amount of acid mixture solution is prepared for a specific amount of carbonaceous material to be digested.

In step 1704, the carbonaceous material is prepared by sizing a source of carbonaceous material, such as a preparation plant settling pond stream. This step further includes wetting the carbonaceous material with $H_2O$ to a desired content, such as from about 8% to about 10% w/w. This step may further include the application of ultrasonic waves to the carbonaceous material during prior to or during the sizing operation.

In step 1706, the carbonaceous material and acid mixture solution are combined in a digestion vessel which is temperature and pressure controlled. This step may further include transferring the carbonaceous material/acid mixture solution to a second digestion vessel for additional digestion time. This step may further include transferring the carbonaceous material/acid mixture solution to a third digestion vessel for addition digestion time. This step may further include the application of ultrasonic waves to the digestion vessel or to a roundabout or circuit pipe that takes a stream of the carbonaceous material/acid mixture solution out of the digestion vessel and then later inputs it back into the digestion vessel after the application of ultrasonic waves for improved digestion.

In step 1708, the carbonaceous material/acid mixture solution is transferred to a centrifuge for removal of the acid mixture solution. This step may further include spraying rinse water into the centrifuge for washing any residual acid mixture solution from the carbonaceous material. This may be followed by additional centrifuging until the carbonaceous material has a desirable moisture content.

In step 1710, the carbonaceous material may be further dried and separated based on densities to achieve the size of desirable product for a particular application or order. This step may include applying an air flow in a vertical vessel such that the less dense carbonaceous material is removed from the top of the dryer while the more dense carbonaceous material is retained in the dryer for removal to a storage vessel, such as a sack. In step 1712, the carbonaceous material is finished and weighed into final storage containers, such as sacks for their intended purpose. The process described herein is scale independent and can be used on a micro-scale, mesa-scale, and macro-scale.

Figure 18:
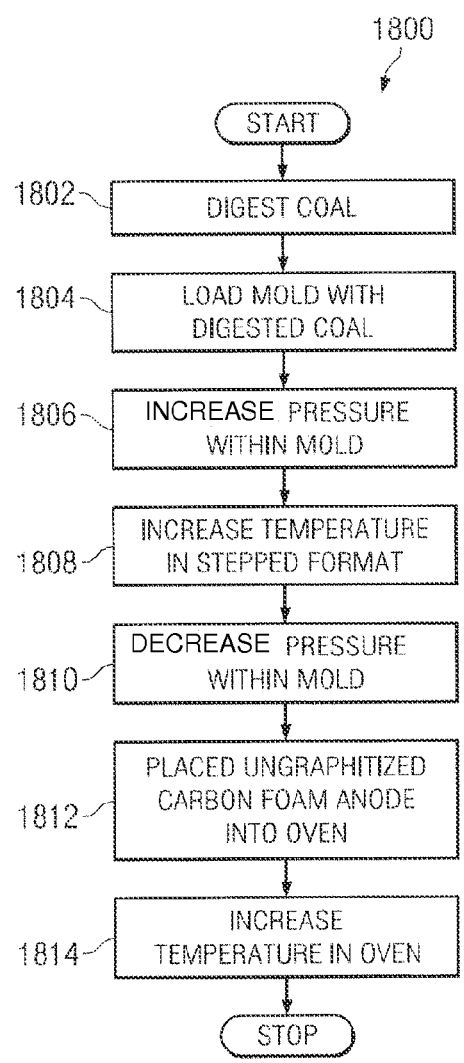
FIG. 18 illustrates a flow diagram for an exemplary process for making a carbon foam anode.

In another embodiment, the present invention further includes methods for making carbon foam anodes. FIG. 18 illustrates an embodiment 1800 of a method for making a carbon foam anode. In step 1802, a supply of carbonaceous material is digested according to the description and principles described herein. An acid mixture solution is contacted with a supply of sized coal to produce a digested coal in accordance with the description and principles herein described. This step may further include reducing the size of the coal to a desirable size for use in the mold 1002.

In step 1804, the digested coal is loaded into the mold 1002. This step further includes securing the mold 1002 in preparation of subjecting it to temperature and pressures as described herein. As described above, the digested coal may be placed within the interior of the mold 1002 after separating the bottom portion 1004 from the top portion 1006 of the mold 1002. This step then further includes joining the portions back together prior to molding. This step may also include loading the digested coal through an inlet on the mold 1002, such as inlet 1010.

In step 1806, the pressure within the mold is increased up to approximately 10 atmospheres. A positive pressure is produced by the vacuum and/or pressure source 1016 and is supplied to the mold 1002 via tube 1012, valve 1014, and vacuum and/or pressure gauge 1018. In step 1808, the temperature within the mold 1002 is increased in a stepped or programmed fashion as described herein. In one embodiment, the temperature is increased until it reaches approximately 380° C. As discussed above, the temperature provided to the mold 1002 may be done so in a ramped or stepped manner.

In step 1810, the pressure is decreased within the mold 1002, preferably to one atmosphere or less within a period of less than or approximately to 10 seconds, preferably less than approximately 6 seconds. In another configuration, the method includes decreasing said pressure in a time duration from about 3 seconds to about 7 seconds. In one aspect, the pressure may be reduced before heating. In step 1812, the ungraphitized carbon foam anode may be removed from the mold 1002 and placed into the graphitization oven 1202. In another embodiment, the mold 1002 containing the ungraphitized carbon foam anode may be placed in the graphitization oven 1202. In step 1814, the temperature is ramped or stepped up to approximately 3,000.degree.C. and held for a period of time until the ungraphitized carbon foam anode is turned into a graphitized carbon foam anode 1204.

There has been described a system for making carbon foam anodes. It should be understood that the particular embodiments described within this specification are for purposes of example and should not be construed to limit the invention.

Further, it is evident that those skilled in the art may now make numerous uses and modifications of the specific embodiment described, without departing from the inventive concepts. For example, different temperatures, pressures, acid mixture solution compositions, solvent compositions, and the like may be changed or altered to fit within the present system for making carbon foam anodes described herein or other without departing from the inventive concepts.

What is claimed:

1. A method for making a carbon foam anode comprising:
    digesting sized coal with an acid mixture solution to decrease amounts of impurities, minerals, and contaminants within said coal and produce a digested coal/acid mixture solution;
    separating said digested coal from said digested coal/acid mixture solution;
    placing said separated digested coal into a mold having an interior;
    applying a positive pressure to said coal within said mold interior of from about 1 atm to about 10 atm;
    applying heat to said coal within said mold interior in a stepped or ramped program to a maximum temperature of from approximately 200° C. to about 700° C. while maintaining said positive pressure;
    forming ungraphitized carbon foam by using a vacuum source to apply a negative pressure to said coal within said mold interior of from about 1 atm to about 0 atm within about 10 seconds or less upon reaching said maximum temperature; and
    forming said carbon foam anode by graphitizing said ungraphitized carbon foam.

2. The method of claim 1, wherein said maximum temperature is from about 380° C. to about 500° C.

3. The method of claim 1, wherein said negative pressure is applied within 6 seconds or less upon reaching said maximum temperature.

* * * * *